United States Patent
Kim et al.

(10) Patent No.: US 10,129,560 B2
(45) Date of Patent: Nov. 13, 2018

(54) METHOD AND APPARATUS FOR PROCESSING VIDEO SIGNAL

(71) Applicant: LG ELECTRONICS INC., Seoul (KR)

(72) Inventors: Taesup Kim, Seoul (KR); Sunmi Yoo, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/904,638

(22) PCT Filed: Jul. 18, 2014

(86) PCT No.: PCT/KR2014/006524
§ 371 (c)(1),
(2) Date: Jan. 12, 2016

(87) PCT Pub. No.: WO2015/009092
PCT Pub. Date: Jan. 22, 2015

(65) Prior Publication Data
US 2016/0173903 A1   Jun. 16, 2016

Related U.S. Application Data

(60) Provisional application No. 61/856,012, filed on Jul. 18, 2013.

(51) Int. Cl.
*H04N 19/52*   (2014.01)
*H04N 19/176*   (2014.01)
(Continued)

(52) U.S. Cl.
CPC .......... *H04N 19/52* (2014.11); *H04N 19/136* (2014.11); *H04N 19/176* (2014.11); *H04N 19/44* (2014.11); *H04N 19/597* (2014.11)

(58) Field of Classification Search
CPC ...... H04N 19/52; H04N 19/176; H04N 19/44; H04N 19/136; H04N 19/597
(Continued)

(56) References Cited

U.S. PATENT DOCUMENTS

| | | | | |
|---|---|---|---|---|
| 2008/0247462 | A1* | 10/2008 | Demos | H04N 19/597 375/240.03 |
| 2009/0010323 | A1* | 1/2009 | Su | H04N 19/597 375/240.01 |

(Continued)

FOREIGN PATENT DOCUMENTS

| | | |
|---|---|---|
| CN | 101374235 A | 2/2009 |
| JP | 2012151576 A | 8/2012 |

(Continued)

OTHER PUBLICATIONS

Zhang, Li, "3D-CE5h: Merge candidates derivation from disparity vector shifting," Joint Collaborative Team on 3D Video Coding Extension Development of ITU-T SG 16 WP 3 and ISO/IEC JTC 1/SC 29/WG 11, JCT3V-00045, Jan. 17-23, 2013, XP030130461.

(Continued)

*Primary Examiner* — Jay Patel
*Assistant Examiner* — Salame Amr
(74) *Attorney, Agent, or Firm* — Dentons US LLP (57) ABSTRACT

The present invention relates to a method and an apparatus for processing a video signal. The present invention can acquire an inter-view motion vector of a current block, acquire a first corresponding block by using the inter-view motion vector, identify a prediction method of the first corresponding block, acquire a second corresponding block when the first corresponding block is not coded by a time inter prediction, acquire a time motion vector of the second corresponding block, acquire a time motion vector of the current block by using the time motion vector of the second (Continued)

corresponding block, and decode the current block by using the time motion vector of the current block.

8 Claims, 6 Drawing Sheets

(51) Int. Cl.
*H04N 19/44* (2014.01)
*H04N 19/136* (2014.01)
*H04N 19/597* (2014.01)

(58) Field of Classification Search
USPC .................................................. 375/240.16
See application file for complete search history.

(56) References Cited

U.S. PATENT DOCUMENTS

| | | | |
|---|---|---|---|
| 2010/0266042 A1 | 10/2010 | Koo et al. | |
| 2012/0224634 A1* | 9/2012 | Yamori | H04N 19/597 375/240.16 |
| 2012/0269270 A1 | 10/2012 | Chen et al. | |
| 2013/0242046 A1* | 9/2013 | Zhang | H04N 19/597 348/43 |
| 2013/0243093 A1* | 9/2013 | Chen | H04N 19/597 375/240.16 |
| 2014/0169475 A1* | 6/2014 | Zhang | H04N 19/597 375/240.16 |
| 2014/0341291 A1* | 11/2014 | Schwarz | H04N 19/597 375/240.16 |
| 2015/0085933 A1* | 3/2015 | Yie | H04N 13/0048 375/240.16 |
| 2015/0181232 A1* | 6/2015 | Takahashi | H04N 19/597 375/240.16 |

FOREIGN PATENT DOCUMENTS

| | | |
|---|---|---|
| JP | 2012182616 A | 9/2012 |
| JP | 2013078097 A | 4/2013 |
| KR | 10-2012-0084629 A | 7/2012 |
| KR | 10-2012-0118780 A | 10/2012 |
| KR | 1020130044189 A | 5/2013 |
| WO | 2012-144829 A2 | 10/2012 |
| WO | 2012-148138 A2 | 11/2012 |
| WO | 2013-053309 A1 | 4/2013 |

OTHER PUBLICATIONS

Guillemot, Christine, "3D-CE5h: Additonal merge candidates derived from shifted from disparity candidate predictors,"Joint Collaborative Team on 3D Video Coding Extension Development of ITU-T SG 16 WP 3 and ISO/IEC JTC 1/SC 29/WG 11, JCT3V-00148, Jan. 17-23, 2013, XP030130564.

Tech, Gerhard, "3D-HEVC Test Model 4," Joint Collaborative Team on 3D Video Coding Extension Development of ITU-T SG 16 WP 3 and ISO/IEC JTC 1/SC 29/WG 11, JCT3V-D1005-v1, Apr. 20-26, 2013, XP030130983.

Lin, Jian-Liang, et al., "3D-CE5.h related: Simplification on disparity vector derivation for HEVC-based 3D video coding," Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, Document: JCT2-A0047, 3 pages.

* cited by examiner

METHOD AND APPARATUS FOR PROCESSING VIDEO SIGNAL

This application is a U.S. National Phase Application under 35 U.S.C. § 371 of International Application PCT/KR2014/006524 filed on Jul. 18, 2014, which claims the benefit of U.S. Provisional Application Nos. 61/856,012 filed on Jul. 18, 2013, the entire content of the prior applications is hereby incorporated by reference.

TECHNICAL FIELD

The present invention relates to a method of coding a video signal and an apparatus therefor.

BACKGROUND ART

Compression encoding indicates a series of signal processing technologies for transmitting digitized information through a communication link or storing the digitized information in a form appropriate for a storing media. A target of the compression encoding includes voice, a video, a text and the like. In particular, a technology for performing the compression encoding on a target of a video is called a video image compression. A general characteristic of a multiview video is to have spatial redundancy, temporal redundancy and intertemporal redundancy.

DISCLOSURE OF THE INVENTION

Technical Task

An object of the present invention is to increase a coding efficiency of a video signal.

Technical Solution

According to the present invention, whether or not a corresponding block is coded by a time inter prediction is identified via a prediction method of the corresponding block. If the corresponding block is coded by the time inter prediction, a time motion vector of a current block can be obtained using a time motion vector of the corresponding block.

According to the present invention, if a corresponding block is not coded by a time inter prediction, a corresponding block different from an identified corresponding block can be obtained by modifying an inter-view motion vector of a current block.

Technical tasks obtainable from the present invention are non-limited the above-mentioned technical task. And, other unmentioned technical tasks can be clearly understood from the following description by those having ordinary skill in the technical field to which the present invention pertains.

Advantageous Effects

According to the present invention, although there is no time motion vector corresponding to a first corresponding block, it is able to prevent a case of not obtaining a time motion vector of a current block from being occurred by obtaining a corresponding block including a time motion vector.

Effects obtainable from the present invention may be non-limited by the above mentioned effect. And, other unmentioned effects can be clearly understood from the following description by those having ordinary skill in the technical field to which the present invention pertains.

BEST MODE

According to the present invention, a method of processing a video signal can include the steps of obtaining an inter-view motion vector of a current block, obtaining a first corresponding block using the inter-view motion vector, identifying a prediction method of the first corresponding block, if the first corresponding block is not coded by a time inter prediction, obtaining a second corresponding block, obtaining a time motion vector of the second corresponding block, obtaining a time motion vector of the current block using the time motion vector of the second corresponding block and decoding the current block using the time motion vector of the current block.

According to the present invention, the step of obtaining the second corresponding block can include the steps of modifying the inter-view motion vector and obtaining the second corresponding block using the modified inter-view motion vector.

According to the present invention, if the first corresponding block is coded by the time inter prediction, the method can further include the steps of obtaining a time motion vector of the first corresponding block and obtaining the time motion vector of the current block using the time motion vector of the first corresponding block.

According to the present invention, the inter-view motion vector of the current block can be obtained from a neighboring block of the current block.

According to the present invention, the inter-view motion vector of the current block can be obtained using a depth value of a depth block corresponding to the current block.

Mode for Invention

A technology for performing compression encoding or decoding on a multiview video signal considers spatial redundancy, temporal redundancy and intertemporal redundancy. In case of a multiview image, it may be able to perform coding on a multiview texture image captured at two or more viewpoints to implement a three dimensional (3D) image. And, if necessary, it may be able to further perform coding on a depth data corresponding to the multiview texture image. In case of coding the depth data, it is apparent that it is able to perform compression coding on the depth data in consideration of spatial redundancy, temporal redundancy and inter-temporal redundancy. The depth data corresponds to data in which information on a distance between a camera and a corresponding pixel is represented. In the present invention, the depth data can be flexibly interpreted as such information related to depth as depth information, a depth image, a depth picture, a depth sequence, a depth bit stream and the like. And, in the present invention, coding can include both a concept of encoding and a concept of decoding and can be flexibly interpreted according to a technical idea and a technical scope of the present invention.

Figure 1:
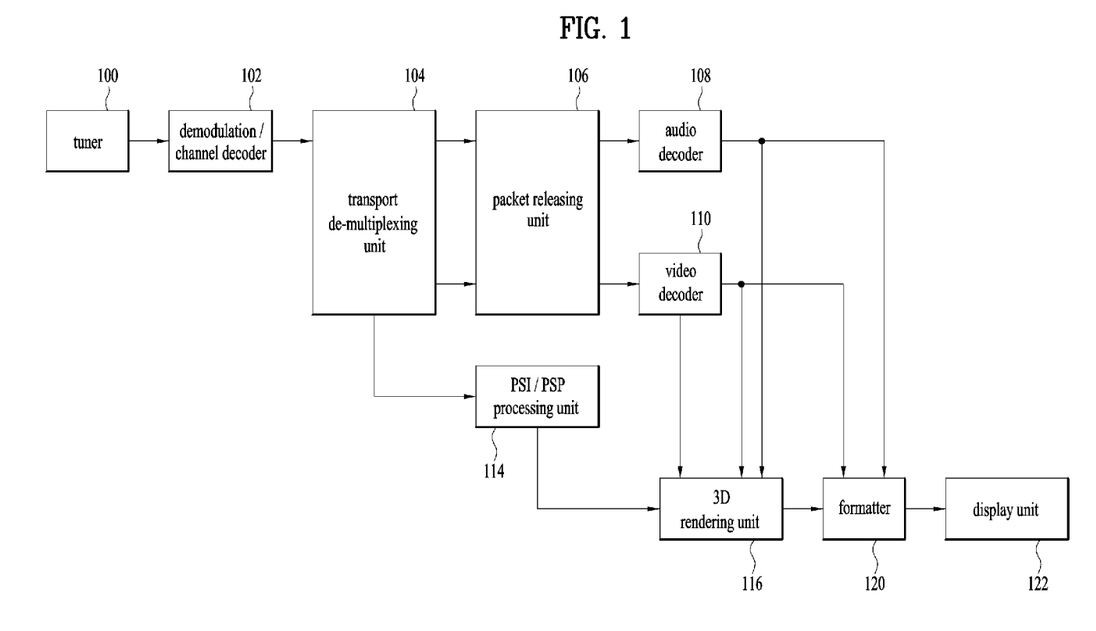
FIG. 1 is an internal block diagram for a broadcasting receiver to which depth coding is applied as an embodiment to which the present invention is applied.

FIG. 1 is an internal block diagram for a broadcasting receiver to which depth coding is applied as an embodiment to which the present invention is applied.

A broadcasting receiver according to the present embodiment is configured to receive an airwave broadcasting signal and play an image. The broadcasting receiver can generate 3D contents using received depth-related information. The broadcasting receiver includes a tuner 100, a demodulation/channel decoder 102, a transport de-multiplexing unit 104, a packet releasing unit 106, an audio decoder 108, a video decoder 110, an PSI/PSIP processing unit 114, a 3D rendering unit 116, a formatter 120 and a display unit 122.

The tuner 100 selects a broadcasting signal of a channel selected from a plurality of broadcasting signals inputted via an antenna (not depicted) and outputs the selected broadcasting signal. The demodulation/channel decoder 102 demodulates the broadcasting signal received from the tuner 100, performs error correction decoding on the demodulated signal and outputs a transport stream (TS). The transport de-multiplexing unit 104 de-multiplexes the transport stream, separates a video PES from an audio PES and extracts PSI/PSIP information from the transport stream. The packet releasing unit 106 releases a packet from the video PES and the audio PES and restores a video ES and an audio ES. The audio decoder 108 outputs an audio bit stream by decoding the audio ES. The audio bit stream is converted into an analog voice signal by a digital-analog converter (not depicted), amplified by an amplifier (not depicted) and outputted via a speaker (not depicted). The video decoder 110 restores an original image by decoding the video ES. A decoding procedure of the audio decoder 108 and the video decoder 110 can be performed based on a packet ID (PID) checked by the PSI/PSIP processing unit 114. In the decoding procedure, the video decoder 110 can extract depth information. And, the video decoder can extract additional information (e.g., camera information) necessary for generating an image of a virtual camera view or information (e.g., geometric information such as object contour, object transparency information and color information) necessary for estimating an area (occlusion) blocked by an object positioned at the relatively front and can provide the information to the 3D rendering unit 116. Yet, according to a different embodiment of the present invention, the depth information and/or the additional information can be separated from each other by the transport de-multiplexing unit 104.

The PSI/PSIP processing unit 114 receives the PSI/PSIP information from the transport de-multiplexing unit 104, parses the information and stores the parsed information in a memory (not depicted) or a register. By doing so, broadcasting can be played on the basis of the stored information.

The 3D rendering unit 116 can generate color information, depth information and the like in a position of a virtual camera using a restored image, depth information, additional information and a camera parameter.

And, the 3D rendering unit 116 performs 3D warping using a restored image and depth information on the restored image and generates a virtual image in a virtual camera position. Although the present embodiment explains the 3D rendering unit 116 as a block configured in a manner of being separated from the video decoder 110, this is just an embodiment only. The 3D rendering unit 116 can be included in the video decoder 110.

The formatter 120 formats an image restored in the decoding procedure, i.e., an image captured by an actual camera, and a virtual image generated by the 3D rendering unit 116 in accordance with a displaying scheme of the corresponding receiver and makes a 3D image to be displayed via the display unit 122. In this case, synthesizing a depth information and a virtual image in the virtual camera position synthesized by the 3D rendering unit 116 and image formatting formatted by the formatter 120 can be selectively performed in response to a command of a user. In particular, a viewer can make a synthesized image not to be displayed by controlling a remote controller (not depicted) and may be able to designate time on which images are to be synthesized with each other.

As mentioned in the foregoing description, although the depth information is used by the 3D rendering unit 116 to generate a 3D image, as a different embodiment, the depth information can be used by the video decoder 110 as well. In the following, various embodiments of using the depth information used by the video decoder 110 are explained.

Figure 2:
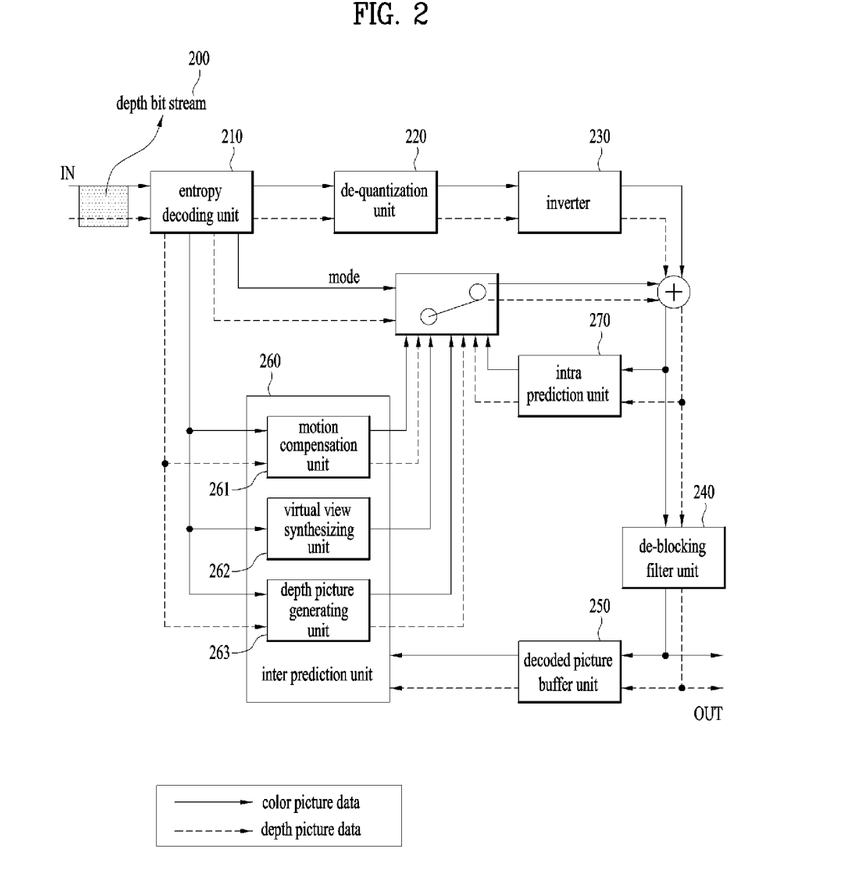
FIG. 2 is a schematic block diagram for a video decoder as an embodiment to which the present invention is applied.

FIG. 2 is a schematic block diagram for a video decoder as an embodiment to which the present invention is applied.

Referring to FIG. 2, the video decoder 110 can include an entropy decoding unit 210, a de-quantization unit 220, an inverter 230, a de-blocking filter unit 240, a decoded picture buffer unit 250, an inter prediction unit 260 and an intra prediction unit 270. In this case, a solid line indicates a flow of a color picture data and a dotted line indicates a flow of a depth picture data. Although the color picture data and the depth picture data are displayed in a manner of being separated from each other in FIG. 2, it may indicate a separate bit stream or a data flow only in a single bit stream. In particular, the color picture data and the depth picture data can be transmitted via a single bit stream or bit streams different from each other. FIG. 2 shows a data flow only. The present invention may be non-limited by a case of transmitting all data in a single decoder.

First of all, in order to decode a received depth bit stream 200, parsing is performed in NAL unit. In this case, various attribute information related to depth can be included in a NAL header region, an extended region of a NAL header, a sequence header region (e.g., a sequence parameter set), an extended region of a sequence header, a picture header region (e.g., a picture parameter set), an extended region of a picture header, a slice header region, an extended region of a slice header, a slice data region or a macro block region. Although depth coding can be used by a separate codec, if depth coding is compatible with a legacy codec, it may be more efficient to add various attribute information related to depth in case of a depth bit stream only. For example, it may be able to add depth identification information capable of identifying whether or not a bit stream corresponds to a depth bit stream in the sequence header region (e.g., a sequence parameter set) or the extended region of the sequence header. Attribute information on a depth sequence can be added only when an inputted bit stream corresponds to depth coded bit stream according to the depth identification information.

The parsed depth bit stream 200 is entropy decoded via the entropy decoding unit 210. A coefficient of each macro block, a moving vector and the like are extracted from the depth bit stream. The de-quantization unit 220 obtains a converted coefficient value in a manner of multiplying a received quantized value by a prescribed constant and the inverter 230 restores depth information of a depth picture by inverting the coefficient value. The intra prediction unit 270 performs prediction in a screen using the restored depth information of a current depth picture. Meanwhile, the de-blocking filter unit 240 applies de-blocking filtering to each of coded macro blocks to reduce a block distortion phenomenon. A filter improves image quality of a decoded frame in a manner of making an edge of a block to be smooth. A filtering procedure is selected based on boundary strength and a change (gradient) of an image sample near a boundary. In order to output filtered depth pictures or use the pictures as a reference picture, the pictures are stored in the decoded picture buffer unit 250.

The decoded picture buffer unit 250 performs a role of storing/opening previously coded depth pictures to perform prediction between screens. In this case, in order to store or open the depth pictures in the decoded picture buffer unit 250, it may use frame_num of each picture and a POC (picture order count). In case of performing depth coding, since there exist depth pictures of a view different from a view of a current depth picture among the previously coded pictures, in order to utilize the pictures as a reference picture, it may be able to use not only the frame_num and the POC but also depth view information for identifying a view of a depth picture.

And, the coded picture buffer unit 250 can use information on a depth view to generate a reference picture list for prediction between views of depth pictures. For example, the coded picture buffer unit 250 can use depth-view reference information. The depth-view reference information corresponds to information used for indicating a dependency relationship between views of depth pictures. For example, the depth-view reference information may include the total number of depth views, a depth view identification number, the number of depth-view reference pictures, a depth view identification number of a depth-view reference picture and the like.

In order to more flexibly implement prediction between screens, the coded picture buffer unit 250 manages a reference picture. For example, it may use a memory management control operation method and a sliding window method. This is intended for integrating a memory of a reference picture and a memory of a non-reference picture into a single memory and efficiently managing the reference picture and the non-reference picture with a small memory. In case of performing depth coding, depth pictures can be marked with a separate indication to distinguish the depth pictures from color pictures in the coded picture buffer unit. It may be able to use information for identifying each depth picture in the marking procedure. The reference pictures managed by the aforementioned procedure can be used by the inter prediction unit 260 for depth coding.

Referring to FIG. 2, the inter prediction unit 260 can include a motion compensation unit 261, a virtual view synthesizing unit 262 and a depth picture prediction unit 263.

The motion compensation unit 261 compensates for a motion of a current block using information transmitted from the entropy decoding unit 210. The motion compensation unit 261 extracts a motion vector of blocks in the vicinity of the current block from a video signal and obtains a motion vector prediction vale of the current block. The motion compensation unit 261 compensates for the motion of the current block using the motion vector prediction value and a difference vector extracted from the video signal. The compensation for the motion can be performed using a single reference picture or a plurality of reference pictures. In case of performing depth coding, if a current depth picture refers to a depth picture of a different view, compensation for the motion can be performed using information on a reference picture list for prediction between views of depth pictures stored in the coded picture buffer unit 250. And, it may be able to perform the motion compensation using depth view information for identifying a view of the depth picture And, the virtual view synthesizing unit 262 synthesizes a color picture of a virtual view using a color picture of a view neighboring a view of a current color picture. In order to use color pictures of views adjacent to each other or use color pictures of a preferred specific view, it may be able to use view identification information indicating the view of the color picture. In case of generating the color picture of the virtual view, it may be able to define flag information indicating whether to generate the color picture of the virtual view. If the flag information indicates to generate the color picture of the virtual view, the color picture of the virtual view can be generated using the view identification information. The color picture of the virtual view obtained by the virtual view synthesizing unit 262 can be used as a reference picture. In this case, it is apparent that the view identification information is also assigned to the color picture of the virtual view.

As a different embodiment, the virtual view synthesizing unit 262 can synthesize a depth picture of a virtual view using a depth picture of a view neighboring a view of a current depth picture. Similarly, it may be able to use depth view identification information to indicate a view of a depth picture. In this case, the depth view identification information can be induced from view identification information of a corresponding color picture. For example, the corresponding color picture can include information on a picture output order identical to a picture output order of the current depth picture and identical view identification information.

The depth picture generating unit 263 can generate a current depth picture using depth coding information. In this case, the depth coding information can include a distance variable (e.g., Z coordinate on a camera coordinate system, etc.) indicating a distance between a camera and an object, macro block type information for depth coding, boundary line identification information in a depth picture, information indicating whether or not data in RBSP includes depth coded data, information indicating a type of data among depth picture data, color picture data and parallax data, and the like. And, it is able to predict a current depth picture using the depth coding information. In particular, it is able to perform inter-prediction using a neighboring depth picture of a current depth picture. It is able to perform the inter-prediction using decoded depth information in the current depth picture.

The aforementioned motion compensation unit 161 can obtain a motion vector prediction value from a corresponding block positioned at a neighboring view of a current block. In this case, the corresponding block can be defined by a block positioned at a view different from a current view at which the current block is positioned. The corresponding block can be obtained or a position of the corresponding block can be specified using an inter-view motion vector corresponding to the current block. In the present invention, the corresponding block can include a first corresponding block to a sixth corresponding block. If the corresponding block is coded by time inter prediction, the motion compensation block 261 can obtain a motion vector of the corresponding block as a prediction value. Yet, if the corresponding block is coded by intra prediction, it is unable to use the motion vector of the corresponding block.

Hence, when the corresponding block does not have a motion vector, the present invention proposes a method of decoding a current block by obtaining a motion vector of the current block and an apparatus therefor.

Figure 3:
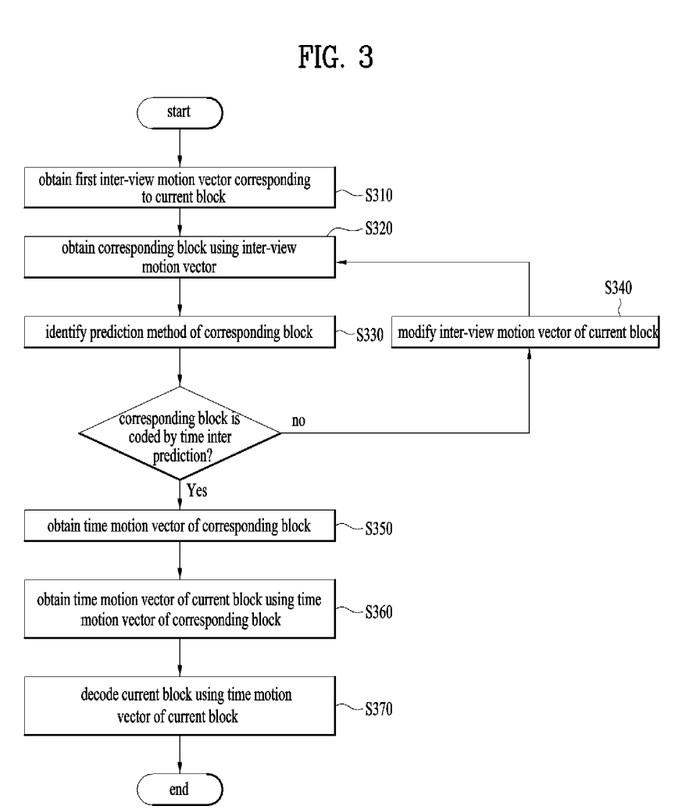
FIG. 3 is a flowchart for an embodiment of decoding a current block by obtaining a motion vector of the current block as an embodiment to which the present invention is applied.

FIG. 3 is a flowchart for an embodiment of decoding a current block by obtaining a motion vector of the current block as an embodiment to which the present invention is applied.

It is able to obtain a first inter-view motion vector corresponding to a current block [S310]. In this case, the first inter-view motion vector can be defined by a motion vector indicating a corresponding block in a reference picture of a reference view from the current block. The first inter-view motion vector can be obtained using an inter-view motion vector of a neighboring block of the current block. Or, the first inter-view motion vector can be obtained using a depth value of a depth block corresponding to the current block.

It is able to obtain a corresponding block using an inter-view motion vector [S320]. In this case, the corresponding block corresponds to a block in a reference picture of a reference view adjacent to a current view. The corresponding block may indicate a block corresponding to the inter-view motion vector. In the present invention, the inter-view motion vector includes not only the inter-view motion vector obtained in the step S310 but also an inter-view motion vector modified in the step S340 described in the following. And, in the present invention, the corresponding block can include a first corresponding block corresponding to a first inter-view motion vector obtained in the step S310 and a second corresponding block corresponding to an inter-view motion vector modified in the step S340. The motion compensation unit 261 specifies and obtains a position of the corresponding block in a manner of making an inter-view motion vector correspond to a current block.

It is able to identify a prediction method of a corresponding block [S330]. The prediction method of the corresponding block can be classified into intra prediction and inter prediction. Specifically, the prediction method of the corresponding block can be classified into intra prediction, inter-view inter prediction and time inter prediction. The prediction method of the corresponding block can be identified using prediction type information, motion vector information corresponding to the corresponding block, reference picture information and the like.

The prediction type information can be defined by information indicating a prediction method for coding the corresponding block. Hence, the prediction method of the corresponding block can be identified according to a prediction method indicated by the prediction type information. For example, if the prediction type information indicates the time inter prediction, it is able to recognize that the corresponding block is coded by the time inter prediction.

The motion vector information can be defined as information including at least one selected from the group consisting of information on whether a corresponding block includes a motion vector, information on whether the corresponding block corresponds to an inter-view motion vector and information on whether the corresponding vector corresponds to a time motion vector. For example, if the motion vector information indicates that the corresponding block includes a motion vector and the motion vector corresponds to the time motion vector, it is able to recognize that the corresponding block is coded by the time inter prediction.

The reference picture information can be defined as information including at least one selected from the group consisting of information on whether a corresponding block includes a reference picture, information on whether a reference picture and a corresponding block are in a same view and the like. For example, if the reference picture information indicates that the corresponding block includes a reference picture and the reference picture and the corresponding block are in a same view, it is able to recognize that the corresponding block is coded by time inter prediction.

If the corresponding block is not coded by the time inter prediction, it is able to modify an inter-view motion vector of a current block [S340]. If the corresponding block is coded by intra prediction or inter-view inter prediction instead of the time inter prediction, a time motion vector for obtaining a time motion vector of the current block may not exist. Hence, if the corresponding block is not coded by the time inter prediction, it may be able to modify an inter-view motion vector of the current block to obtain a different corresponding block. A modified inter-view motion vector can be defined as a second inter-view motion vector. In the following, an example of modifying the inter-view motion vector of the current block is explained.

The inter-view motion vector of the current block can be modified using predetermined inter-view motion vector modification information. The predetermined inter-view motion vector modification information is applied to an inter-view motion vector of a current view and is used to generate a modified inter-view motion vector. The predetermined inter-view motion vector modification information can be defined by a difference between the modified inter-view motion vector and an inter-view motion vector of an initially obtained current time.

Hence, the modified inter-view motion vector can be obtained in a manner of obtaining the inter-view motion vector modification information and applying the inter-view motion vector modification information to an initially obtained inter-view motion vector of the current block. For example, the modified inter-view motion vector may indicate the left or the right of the initially obtained inter-view motion vector of the current block.

It is able to obtain a corresponding block (hereinafter, a second corresponding block) of a position different from a position of the firstly obtained corresponding block using the modified inter-view motion vector. Subsequently, a prediction method of the second corresponding block is identified (It is able to identify a prediction method of a corresponding block using a method identical to the step S330). If the second corresponding block is coded by the time inter prediction, it is able to obtain a time motion vector of the corresponding block by performing the step S350. If the second corresponding block is coded by the time inter prediction, the inter-view motion vector of the current block can be modified again to obtain a further different corresponding block ($N^{th}$ corresponding block).

The step S340 can be performed until the corresponding block, which is coded by the time inter prediction, is identified. As a further different embodiment, if it is attempted to identify the corresponding block coded by the time inter as many as a predetermined count but the corresponding block coded by the time inter prediction is not identified, the modification of the step S340 can be terminated.

If the corresponding block is coded by the time inter prediction, it is able to obtain a time motion vector of the corresponding block [S350]. If the corresponding block is coded by the time inter prediction, the corresponding block can include motion information including the time motion vector. In this case, the time motion vector can be defined as a motion vector indicating a view identical to a view of the corresponding block and a reference block in a reference picture of different time.

It is able to obtain a time motion vector of the current block using the time motion vector of the corresponding block [S360]. The time motion vector of the current block uses the time motion vector of the corresponding block as a prediction value and the time motion vector of the current block can be obtained using a motion vector residual. Or, the time motion vector of the current block can be obtained in a manner of using the time motion vector of the corresponding block as it is. In this case, the motion vector residual can be defined by a difference value between an original motion vector and a motion vector prediction value. The motion vector residual can be obtained from a bit stream.

It is able to decode the current block using the time motion vector of the current block [S370]. For example, a pixel value of a reference block indicated by the time motion vector is obtained as a prediction value and a pixel value of the current block can be obtained using the prediction value.

Figure 4:
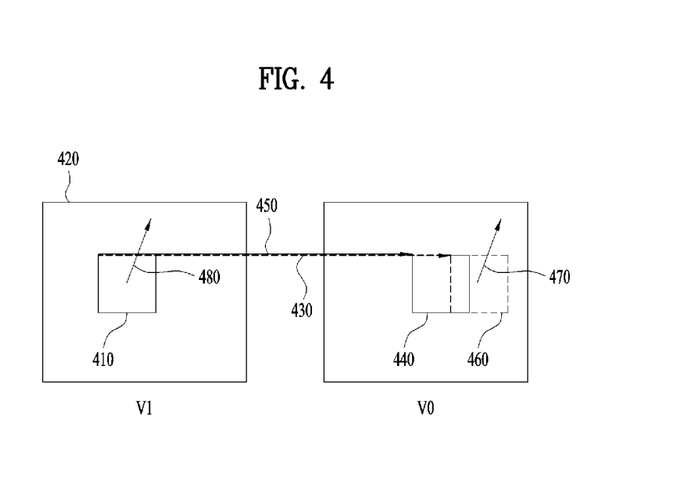
FIG. 4 is a flowchart for an embodiment of decoding a current block by obtaining a time motion vector of the current block as an embodiment to which the present invention is applied.

FIG. 4 is a flowchart for an embodiment of decoding a current block by obtaining a time motion vector of the current block as an embodiment to which the present invention is applied.

A current block 410 is included in a current picture 420 of a current view (V1). And, if an inter-view motion vector 430 of the current block is obtained, it is able to obtain a first corresponding block 440 indicated by the inter-view motion vector 430. If the first corresponding block 440 is not a block coded using a time motion vector, a modified inter-view motion vector 450 can be obtained in a manner of modifying the interview motion vector 430 of the current block. And, it is able to obtain a second corresponding block 460 indicated by the modified inter-view motion vector 450. It is able to obtain a time motion vector 470 which is used for time inter prediction of the second corresponding block 460. It is able to obtain a time motion vector 480 of the current block using the obtained time motion vector 470 of the second corresponding block.

Figure 5:
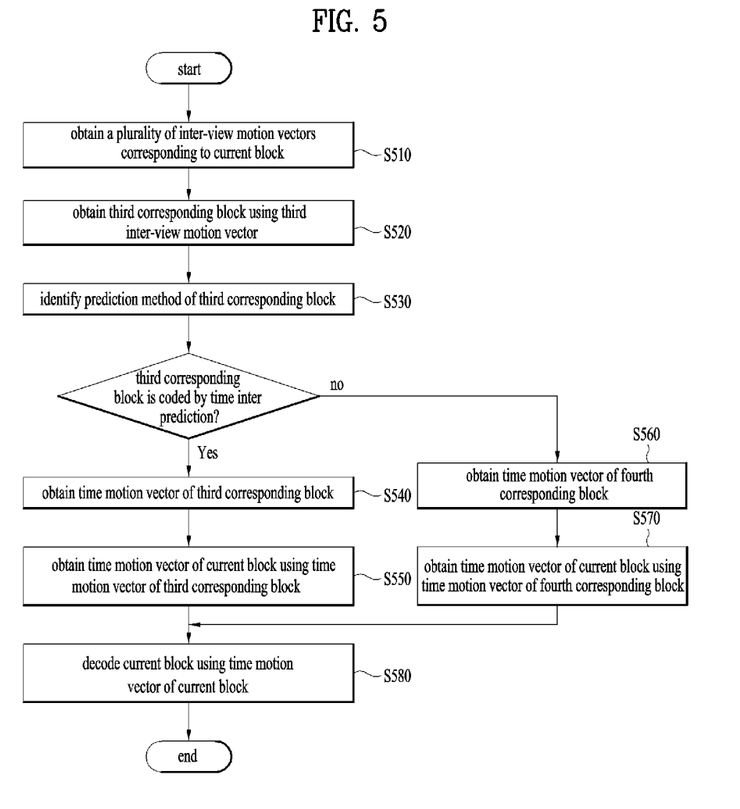
FIG. 5 is a flowchart for an embodiment of decoding a current block by obtaining a time motion vector of the current block as an embodiment to which the present invention is applied.
Figure 6:
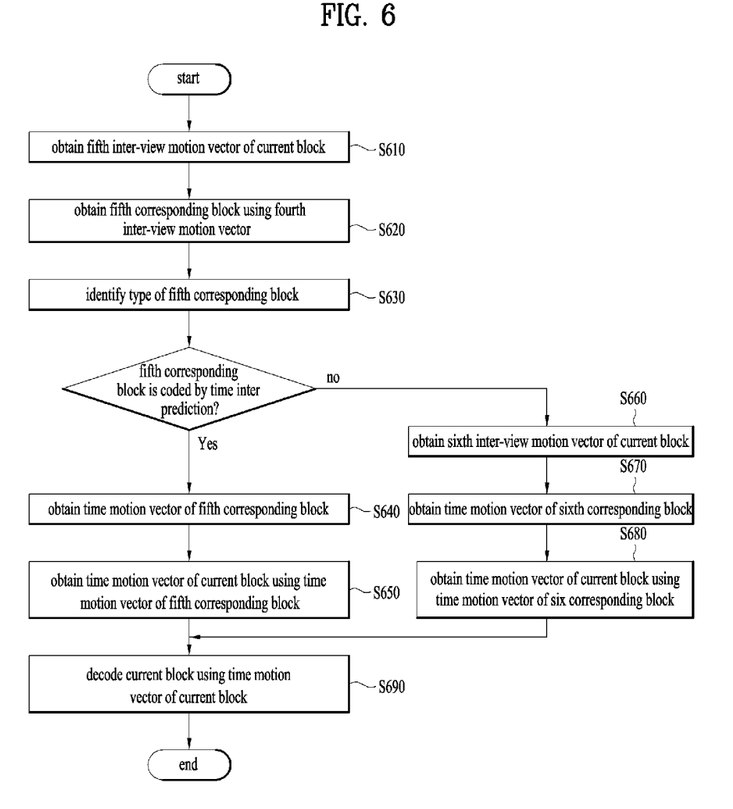
FIG. 6 is a flowchart for an embodiment of decoding a current block by obtaining a time motion vector of the current block as an embodiment to which the present invention is applied.

In the following, a further different embodiment of decoding a current block by obtaining a time motion vector of the current block is explained with reference to FIG. 5 and FIG. 6. In the embodiments of FIG. 5 and FIG. 6, assume that there exist at least two or more inter-view motion vectors corresponding to the current block.

FIG. 5 is a flowchart for an embodiment of decoding a current block by obtaining a time motion vector of the current block as an embodiment to which the present invention is applied.

It is able to obtain a plurality of inter-view motion vectors corresponding to the current block [S510]. A plurality of the inter-view motion vectors corresponding to the current block can indicate inter-view motion vectors different from each other corresponding to the current block. For example, a plurality of the inter-view motion vectors corresponding to the current block can include a third inter-view motion vector and a fourth inter-view motion vector. As an example, if the third inter-view motion vector is obtained using an inter-view motion vector of a neighboring block of the current block, the fourth inter-view motion vector can be obtained using a depth value of a depth block corresponding to the current block. As a different example, if the third inter-view motion vector is obtained using the depth value of the depth block corresponding to the current block, the fourth inter-view motion vector can be obtained using the inter-view motion vector of the neighboring block of the current block. As a further different example, the fourth inter-view motion vector can be obtained by modifying the third inter-view motion vector.

A third corresponding block can be obtained using the third inter-view motion vector [S520]. The third corresponding block may correspond to a block in a reference picture of a neighboring reference view of a current view, which is indicated in a manner of making the third interview motion vector correspond to the current block.

It is able to identify a prediction method of the third corresponding block [S530]. The prediction method of the third corresponding block can be classified into intra prediction and inter prediction. Specifically, the prediction method of the corresponding block can be classified into intra prediction, inter-view inter prediction and time inter prediction. The prediction method of the corresponding block can be identified using prediction type information, motion vector information corresponding to the corresponding block, reference picture information and the like. A method of identifying the prediction method is identical to the method mentioned earlier in the step S340.

If the third corresponding block is coded by the time inter prediction, a time motion vector of the third corresponding block is obtained [S540] and a time motion vector of the current block can be obtained using the time motion vector of the third corresponding block [S550]. A time motion vector of the current block uses the time motion vector of the third corresponding block as a prediction value and the time motion vector of the current block can be obtained using a motion vector residual. Or, the time motion vector of the current block can be obtained in a manner of using the time motion vector of the third corresponding block as it is.

If the third corresponding block is not coded by the time inter prediction, it is able to obtain a time motion vector of a fourth corresponding block [S560]. The fourth corresponding block may correspond to a block in a reference picture of a neighboring reference view of a current view, which is indicated in a manner of making a fourth interview motion vector correspond to the current block.

A time motion vector of the current block can be obtained using the time motion vector of the fourth corresponding block [S570]. A time motion vector of the current block uses the time motion vector of the fourth corresponding block as a prediction value and the time motion vector of the current block can be obtained using a motion vector residual. Or, the time motion vector of the current block can be obtained in a manner of using the time motion vector of the fourth corresponding block as it is.

It is able to decode the current block using the time motion vector of the current block [S580]. For example, a pixel value of a reference block indicated by the time motion vector is obtained as a prediction value and a pixel value of the current block can be obtained using the prediction value.

FIG. 6 is a flowchart for an embodiment of decoding a current block by obtaining a time motion vector of the current block as an embodiment to which the present invention is applied.

It is able to obtain a fifth inter-view motion vector of a current block [S610]. The fifth inter-view motion vector corresponds to an inter-view motion vector corresponding to the current block. The fifth inter-view motion vector can be defined as a motion vector indicating a corresponding block in a reference picture of a reference view from the current block. The fifth inter-view motion vector can be obtained using an inter-view motion vector of a neighboring block of the current block. Or, the fifth inter-view motion vector can also be obtained using a depth value of a depth block corresponding to the current block.

It is able to obtain a fifth corresponding block using the fifth inter-view motion vector [S620]. The fifth corresponding block may correspond to a block in a reference picture of a neighboring reference view of a current view, which is indicated in a manner of making a fifth interview motion vector correspond to the current block.

It is able to identify a prediction method of the fifth corresponding block [S630]. The prediction method of the fifth corresponding block can be classified into intra prediction and inter prediction. Specifically, the prediction method of the corresponding block can be classified into intra prediction, inter-view inter prediction and time inter prediction. The prediction method of the corresponding block can be identified using prediction type information, motion vector information corresponding to the corresponding block, reference picture information and the like. A method of identifying the prediction method is identical to the method mentioned earlier in the step S340.

If the fifth corresponding block is coded by the time inter prediction, a time motion vector of the fifth corresponding block is obtained [S640] and a time motion vector of the current block can be obtained using the time motion vector of the fifth corresponding block [S650]. A time motion vector of the current block uses the time motion vector of the fifth corresponding block as a prediction value and the time motion vector of the current block can be obtained using a motion vector residual. Or, the time motion vector of the current block can be obtained in a manner of using the time motion vector of the fifth corresponding block as it is.

If the fifth corresponding block is not coded by the time inter prediction, it is able to obtain a sixth inter-view motion vector of the current block [S660]. The sixth inter-view motion vector corresponds to an inter-view motion vector corresponding to the current block. The sixth inter-view motion vector can be defined by a motion vector indicating a corresponding block in a reference picture of a reference view from the current block. The sixth inter-view motion vector can be obtained using an inter-view motion vector of a neighboring block of the current block. Or, the sixth inter-view motion vector can also be obtained using a depth value of a depth block corresponding to the current block. Or, the sixth inter-view motion vector can also be obtained by modifying the fifth inter-view motion vector.

It is able to obtain a time motion vector of the sixth corresponding block [S670]. The sixth corresponding block may correspond to a block in a reference picture of a neighboring reference view of a current view, which is indicated in a manner of making a sixth interview motion vector correspond to the current block.

A time motion vector of the current block can be obtained using the time motion vector of the sixth corresponding block [S680]. The time motion vector of the current block uses the time motion vector of the sixth corresponding block as a prediction value and the time motion vector of the current block can be obtained using a motion vector residual. Or, the time motion vector of the current block can be obtained in a manner of using the time motion vector of the sixth corresponding block as it is.

It is able to decode the current block using the time motion vector of the current block [S690]. For example, a pixel value of a reference block indicated by the time motion vector is obtained as a prediction value and a pixel value of the current block can be obtained using the prediction value.

As mentioned in the foregoing description, a decoding/encoding device to which the present invention is applied is installed in a multimedia broadcasting transceiver such as a DMB (digital multimedia broadcasting) and can be used for decoding a video signal, a data signal and the like. And, the multimedia broadcasting transceiver can include a mobile communication terminal.

And, a decoding/encoding method to which the present invention is applied is manufactured by a program drivable in a computer and can be stored in a recording media readable by the computer. A multimedia data including a data structure according to the present invention can also be stored in the recording media readable by the computer. The recording media readable by the computer includes all types of storing devices in which data readable by a computer system is stored. Examples of the recording media readable by the computer include a ROM, a RAM, a CD-ROM, a magnetic tape, a floppy disk, an optical data storing device and the like. And, the recording media can be implemented in a form of a carrier wave (e.g., transmission via the internet). And, a bit stream generated by the encoding method can be stored in the recording media readable by the computer or can be transmitted via a wired/wireless communication network.

INDUSTRIAL APPLICABILITY

The present invention can be used for coding a video signal.

What is claimed is:
1. A method of processing a video signal by a decoding device, comprising:
  obtaining, by the decoding device, an inter-view motion vector of a current block;
  obtaining, by the decoding device, a first corresponding block in a reference view using the inter-view motion vector of the current block;
  identifying, by the decoding device, a prediction method of the first corresponding block;
  when the first corresponding block is not coded by a time inter prediction, obtaining, by the decoding device, a second corresponding block in the reference view using a modified inter-view motion vector of the current block,
  wherein the modified inter-view motion vector is obtained by applying a predetermined difference to the inter-view motion vector such that the modified inter-view motion vector indicates a right of a position indicated by the inter-view motion vector, and
  wherein the predetermined difference is repeatedly applied until the modified inter-view motion vector indicates the second corresponding block coded by the time inter prediction;
  obtaining, by the decoding device, a time motion vector of the second corresponding block;
  obtaining, by the decoding device, a time motion vector of the current block using the time motion vector of the second corresponding block; and
  decoding, by the decoding device, the current block using the time motion vector of the current block.

2. The method of claim 1, further comprising:
when the first corresponding block is coded by the time inter prediction, obtaining a time motion vector of the first corresponding block; and
obtaining the time motion vector of the current block using the time motion vector of the first corresponding block.

3. The method of claim 1, wherein the inter-view motion vector of the current block is obtained from a neighboring block of the current block.

4. The method of claim 1, wherein the inter-view motion vector of the current block is obtained using a depth value of a depth block corresponding to the current block.

5. A video signal processing device comprising: an inter prediction unit configured to obtain an inter-view motion vector of a current block, obtain a first corresponding block in a reference view using the inter-view motion vector of the current block, identify a prediction method of the first corresponding block, when the first corresponding block is not coded by a time inter prediction, obtain a second corresponding block in the reference view using a modified inter-view motion vector of the current block, wherein the modified inter-view motion vector is obtained by applying a predetermined difference to the inter-view motion vector such that the modified inter-view motion vector indicates a right of a position indicated by the inter-view motion vector, and wherein the predetermined difference is repeatedly applied until the modified inter-view motion vector indicates the second corresponding block coded by the time inter prediction, obtain a time motion vector of the second corresponding block, obtain a time motion vector of the current block using the time motion vector of the second corresponding block, and decode the current block using the time motion vector of the current block.

6. The video signal processing device of claim 5, wherein when the first corresponding block is coded by the time inter prediction, the inter prediction unit is configured to obtain a time motion vector of the first corresponding block and obtain the time motion vector of the current block using the time motion vector of the first corresponding block.

7. The video signal processing device of claim 5, wherein the inter-view motion vector of the current block is obtained from a neighboring block of the current block.

8. The video signal processing device of claim 5, wherein the inter-view motion vector of the current block is obtained using a depth value of a depth block corresponding to the current block.

* * * * *